(12) United States Patent
Kim et al.

(10) Patent No.: US 6,809,789 B2
(45) Date of Patent: Oct. 26, 2004

(54) LIQUID CRYSTAL DISPLAY DEVICE

(75) Inventors: Hyang Yul Kim, Kyoungki-do (KR);
Seung Hee Lee, Kyoungki-do (KR)

(73) Assignee: Boe-Hydis Technology Co., Ltd.,
Kyoungki-do (KR)

( * ) Notice: Subject to any disclaimer, the term of this patent is extended or adjusted under 35 U.S.C. 154(b) by 0 days.

(21) Appl. No.: 10/005,060

(22) Filed: Dec. 4, 2001

(65) Prior Publication Data

US 2002/0067448 A1 Jun. 6, 2002

(30) Foreign Application Priority Data

Dec. 5, 2000 (KR) .......................................... 2000-73318

(51) Int. Cl.[7] ............................................ G02F 1/1343
(52) U.S. Cl. ..................... 349/139; 349/141; 349/143
(58) Field of Search ............................... 349/139, 141, 349/129, 126, 142, 143

(56) References Cited

U.S. PATENT DOCUMENTS

| | | | | |
|---|---|---|---|---|
| 5,745,207 A | * | 4/1998 | Asada et al. | 349/141 |
| 6,088,078 A | * | 7/2000 | Kim et al. | 349/141 |
| 6,198,464 B1 | * | 3/2001 | Ota et al. | 345/77 |
| 6,256,081 B1 | * | 7/2001 | Lee et al. | 349/141 |
| 6,285,429 B1 | * | 9/2001 | Nishida et al. | 349/141 |
| 6,469,765 B1 | * | 10/2002 | Matsuyama et al. | 349/143 |
| 2001/0001568 A1 | * | 5/2001 | Hiroshi | 349/143 |
| 2001/0022569 A1 | * | 9/2001 | Ohta et al. | 345/88 |
| 2003/0133068 A1 | * | 7/2003 | Suzuki et al. | 349/141 |

* cited by examiner

*Primary Examiner*—Jerome Jackson
*Assistant Examiner*—Matthew C. Landau
(74) *Attorney, Agent, or Firm*—Ladas & Parry LLP

(57) ABSTRACT

A liquid crystal display device capable of realizing high aperture ratio and high brightness by reducing or removing a conventional black matrix layer is provided. The device has a lower substrate and an upper substrate confronting each other. A counter electrode is formed on the lower substrate, and a pixel electrode is formed on the counter electrode with an insulating layer interposed. A lower polarizing plate and an upper polarizing plate are attached on respective outer sides of the lower and the upper substrates. The device further has a gate bus line and a data bus line. Particularly, a rubbing direction of the lower substrate corresponds with a direction of noise field formed between the data bus line and the pixel electrode or the counter electrode and between the gate bus line and the pixel electrode or the counter electrode.

14 Claims, 8 Drawing Sheets

LIQUID CRYSTAL DISPLAY DEVICE

BACKGROUND OF THE INENTION

1. Field of the Invention

The present invention relates to a liquid crystal display device, and more particularly, to a liquid crystal display device capable of improving aperture ratio by reducing the size of black matrix on a predetermined part or removing the black matrix using a wide view angle method.

2. Description of the Related Art

As well known, a conventional liquid crystal display device has generally employed a twisted nematic (TN) mode, which has a disadvantage of narrow view angle. In order to solve the problem, a fringe field switching (FFS) mode liquid crystal display device has been proposed.

However, according to the conventional structures, although off voltage corresponding to 0V is applied to a pixel electrode and a counter electrode, a predetermined signal is continuously applied to data bus lines to turn on other pixels. Therefore, a noise field is formed between the data bus line and the pixel electrode or between the data bus line and the counter electrode. As a result, liquid crystal molecules are separated from a polarizer axis and light is leaked through the portion. Then, a large black matrix (BM) patterning is required on the upper substrate to prevent the leakage light, thereby reducing aperture ratio in a panel.

Moreover, the black matrix is formed in consideration of assembly margin of upper and lower substrates. Therefore, the reduced aperture ratio makes it difficult to realize high brightness.

FIG. 1A shows a pixel structure of conventional FFS mode. FIG. 1B shows a liquid crystal molecule forming a predetermined angle with the noise field and FIG. 1C relation of the liquid crystal molecule and a polarizing plate.

Referring to the FIGS. 1A–1C, in order to obtain maximum transmittance, negative liquid crystals are rubbed by .+−.12.degree. to a gate bus line 2 and positive liquid crystals by .+−.78.degree. to the gate bus line. Therefore, early liquid crystal molecules 3 are controlled to correspond with the rubbing direction A (as shown in FIG. 1B).

Here; a Noise Field 10 (as shown in FIGS. 1A–1B) is formed between a data bus line 4 and a pixel electrode 6 or between the data bus line 4 and a counter electrode 8.

FIG. 1B is a drawing for showing the operation of liquid crystal molecules 3 to the noise field 10, the liquid crystal molecules forming a predetermined angle with the noise field 10, wherein negative liquid crystals are arranged, the major axis of the liquid crystal molecule 3 being perpendicular to the noise field 10 and positive liquid crystals are arranged, the major axis of the liquid crystal molecule 3 being parallel to the noise field. As a result, as shown in FIG. 1C, the liquid crystal molecules 3 are separated by a predetermined angle from the polarizer axis of the polarizing plate, thereby generating leakage light around the data line 4 at off state.

FIG. 2 is a cross sectional view of conventional liquid crystal display device. As described above, the liquid crystal molecules 3 are separated from the polarizer axis of the polarizing plate 12 by the noise field 10 between the data bus line 4 and the pixel electrode 6 or between the data bus line 4 and the counter electrode 8. Therefore, a large black matrix layer 22, having a width of approximately 27 $\mu$m, is formed on the data bus line 4 in order to prevent leakage light around the data bus line 4.

And, on the gate bus line 2, the black matrix region 22 is formed to have a width of approximately 500 $\mu$m. Therefore, aperture ratio is reduced, thereby lowering brightness of panel.

A conventional in-plane switching (IPS) mode also has the above-mentioned problems.

SUMMARY OF THE INVENTION

It is therefore an object of the present invention to provide a liquid crystal display device capable of realizing high aperture ratio and high brightness by reducing or removing a conventional black matrix layer.

To achieve the above and other objects, the present invention provides a liquid crystal display device that comprises a lower substrate and an upper substrate confronting each other; a counter electrode formed on the lower substrate; a pixel electrode formed on the counter electrode with an insulating layer interposed; a lower polarizing plate and an upper polarizing plate attached on respective outer sides of the lower and the upper substrates; a gate bus line; and a data bus line.

Particularly, in the device of the invention, a rubbing direction of the lower substrate corresponds with a direction of noise field formed between the data bus line and the pixel electrode or the counter electrode and between the gate bus line and the pixel electrode or the counter electrode.

Preferably, the counter electrode may have a shape of box (i.e. generally a planar, rectangular shape) made of a first ITO and the pixel electrode may be formed by patterning a second ITO to have a shape of clamp (i.e., a clamp having two legs with one end of each leg pinned together for pivoting so as to resemble generally a "V" shape) in one sub-pixel or to alternatively have a slant line (/) shape and an inverse-slant line (\) shape by sub-pixels (i.e. each generally V shaped pixel electrode being in a sub-pixel), thereby having FFS mode.

Furthermore, the counter electrode and the pixel electrode may be made of opaque metal and respectively patterned to have a shape of clamp in one sub-pixel or to alternatively have a slant line (/) shape and an inverse-slant line (\) shape by sub-pixels, thereby having IPS mode.

Furthermore, when the rubbing direction of the lower substrate is parallel to the gate bus line, the noise field may be formed between the data bus line and the counter electrode or between the data bus line and the pixel electrode and therefore, a black matrix of the upper substrate may be narrowly formed on the data bus line, or ther is no black matrix of the upper substrate.

Preferably, the black matrix of the upper substrate has a width the same as or smaller than the distance between the counter electrodes formed with the data bus line interposed and more preferably, less than 6 $\mu$m.

And, when the rubbing direction of the lower substrate is perpendicular to the gate bus line, the noise field is formed between the gate bus line and the counter electrode or between the gate bus line and the pixel electrode and therefore, black matrix of the upper substrate is formed on the gate bus line, to have a width the same as or smaller than that of the gate bus line.

Furthermore, the rubbing direction of the lower substrate may be perpendicular to the gate bus line and there may be no black of the upper substrate.

Preferably, the upper substrate may have a rubbing direction anti-parallel or parallel to that of the lower substrate. In addition, the lower polarizing plate may have a polarizer axis corresponding with the rubbing direction of the lower substrate, and the upper polarizing plate may have an analyzer axis perpendicular to the rubbing direction of the lower substrate.

DETAILED DESCRIPTION OF THE INVENTION

The objects and features of the invention may be understood with reference to the following detailed description of an illustrative embodiment of the invention, taken together with the accompanying drawings.

Figure 3A:
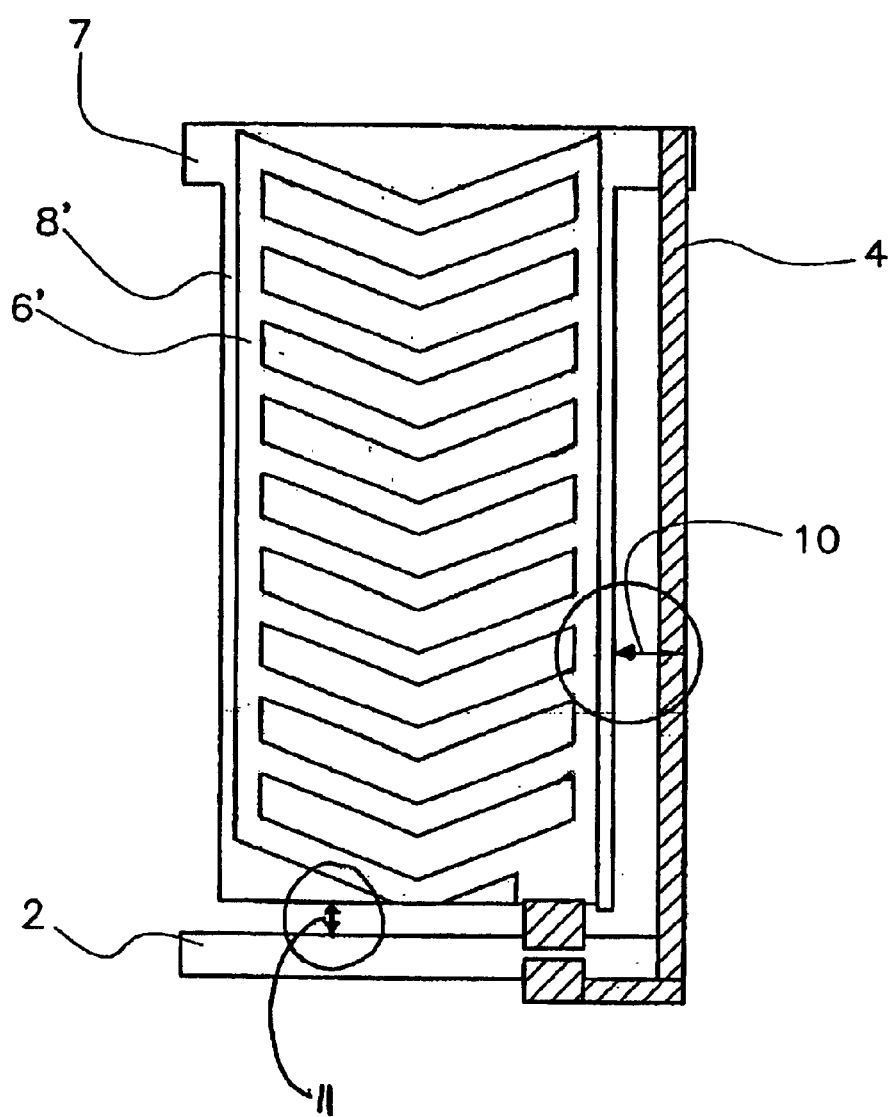
FIGS. 3A to 3C are drawings for showing a structure of liquid crystal display according to an embodiment of the present invention.
Figure 3B:
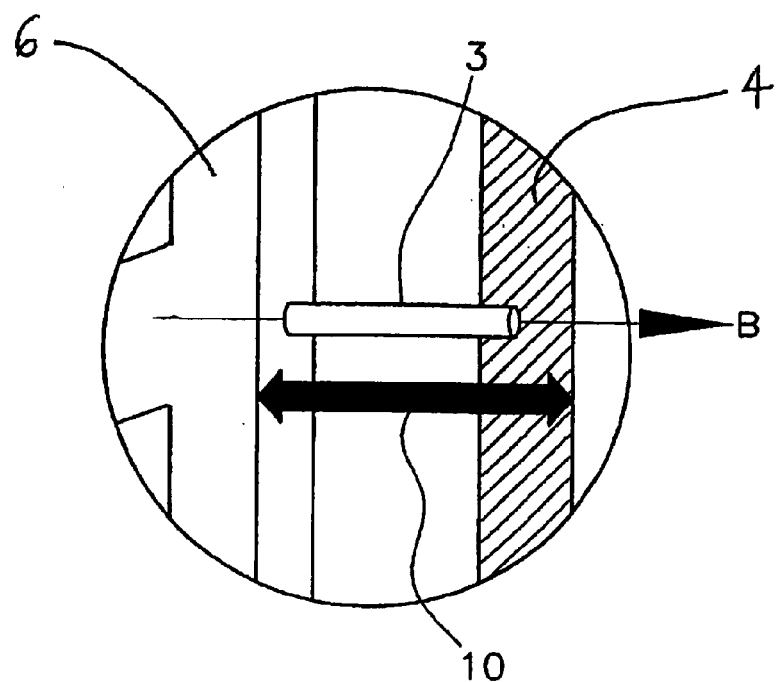
Figure 3C:
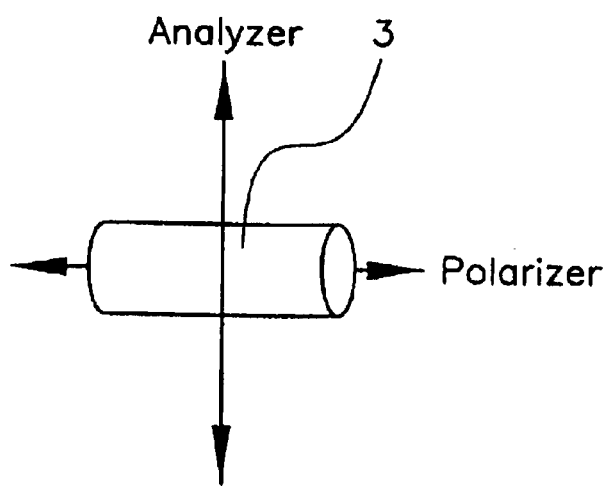
Figure 4:
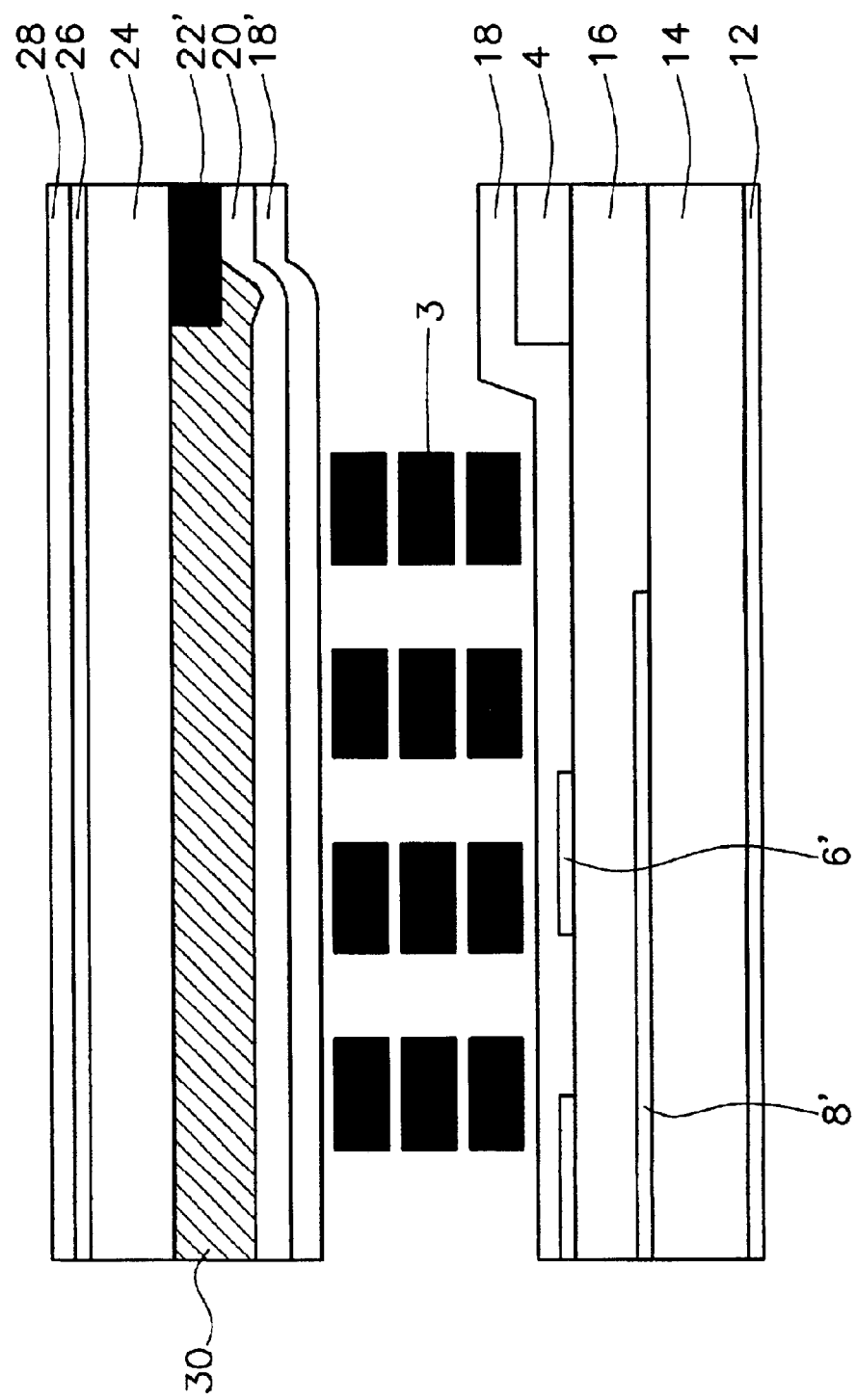
FIG. 4 is a lateral cross sectional view of liquid crystal display according to an embodiment of the present invention.

FIGS. 3A to 3C are drawings for showing a liquid crystal display according to an embodiment of the present invention and FIG. 4 is a lateral cross section view of liquid crystal display according to an embodiment of the present invention.

In the drawings, a reference numeral 3 indicates a liquid crystal molecule, 4 a data bus line, 6' a pixel electrode, 12 a lower polarizing plate, 14 a lower substrate, 16 an insulating layer, 18 and 18' alignment layers, 20 an overcoat (O/C), 22' a black matrix (BM) layer, 24 an upper substrate, 26 an indium tin oxide (ITO) layer and 28 an upper polarizing plate.

According to the present invention, the counter electrode 8', made of a first ITO having a shape of box (or in a rectangular plate shape), the gate bus line 2, the counter electrode bus line 7, the data bus line 4 and TFT are formed in the same method as that of the conventional liquid crystal display. However, a pattern is formed in the shape of a clamp—more specifically, a plurality of parts form the pixel electrode for one pixel and each part substantially resembles the shape of "V" in one sub-pixel—or formed to alternatively have a slant line (/) shape and an inverse-slant line (\) shape by sub-pixels, using the pixel electrode 6' made of a second ITO, in order to solve a color shift problem by compensation structure of the refractivity of the liquid crystal molecule 3.

The rubbing of the lower substrate 14 is performed to be parallel to or perpendicular to the gate bus line 2 and the rubbing of the upper substrate 24 anti-parallel or parallel to that of the lower substrate 14. The polarizer axis of the lower polarizing plate 12 attached on the outer side of the lower substrate 14 corresponds with the rubbing direction of the lower substrate 14 and the analyzer axis of the upper polarizing plate 28 attached on the outer side of the upper substrate 24 is perpendicular to the rubbing direction of the lower substrate 14, thereby forming normally black mode. According to the normally black mode, a dark state is maintained when there is no voltage application.

Generally, the noise field 10 is formed between the data bus line 4 and the pixel electrode 6' or the counter electrode 8'. Another noise field 11 is formed between the gate bus line 2 and the pixel electrode 6' or the counter electrode 8'. When the rubbing is parallel to the gate bus line 2, the rubbing direction corresponds with that of the noise field 10 formed between the data bus line 4 and the pixel electrode 6' or the counter electrode 8'.

And, when the rubbing is perpendicular to the gate bus line 2, the rubbing direction corresponds with that of the noise field 11 formed between the gate bus line 2 and the pixel electrode 6' or the counter electrode 8'. As a result, when positive liquid crystals are employed, the major axis of the liquid crystal molecule 3 is arranged to the rubbing direction and the polarity of spontaneous polarization of the liquid crystal molecule 3, generated by the electric field, is formed at the terminal of major axis of the liquid crystal molecule 3. Therefore, when the rubbing direction corresponds with that of the noise field 10 (as shown in FIG. 3B, element B), the liquid crystal molecules 3 are not affected by the noise field 10.

Figure 1A:
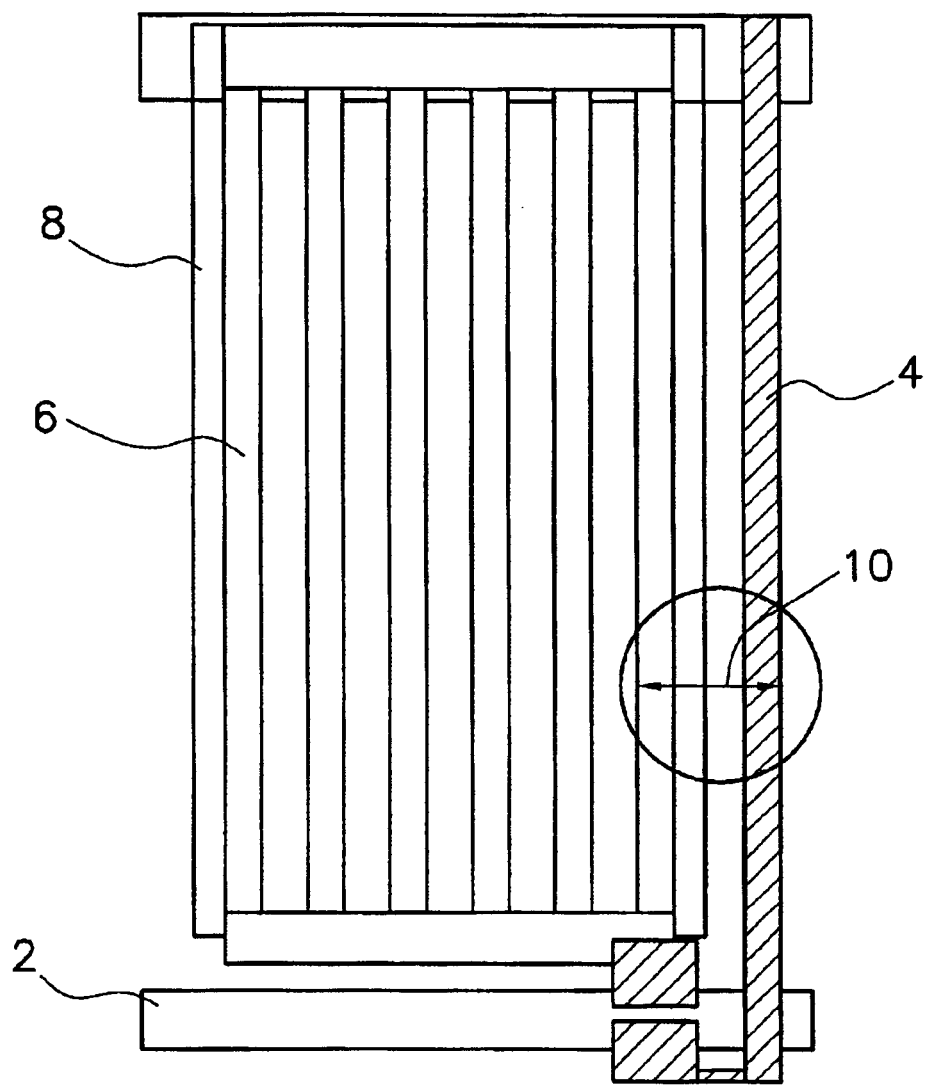
FIG. 1A is a drawing for showing a pixel electrode of conventional FFS mode.
Figure 1B:
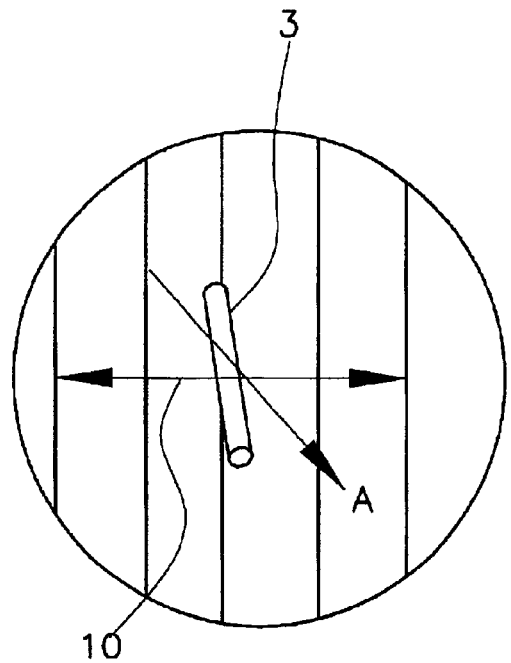
FIG. 1B is a drawing for showing a liquid crystal molecule forming a predetermined angle with noise field.
Figure 1C:
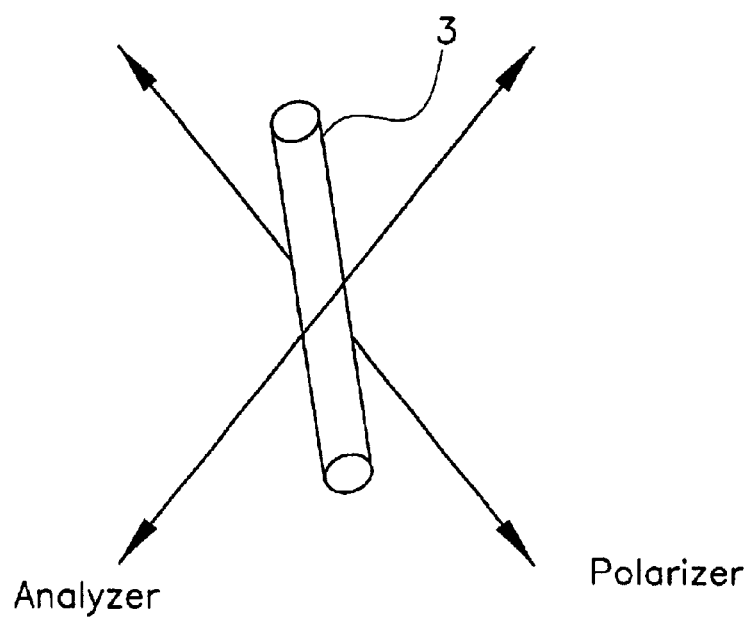
FIG. 1C is a drawing for showing a relation of liquid crystal molecule and polarizing plate.
Figure 2:
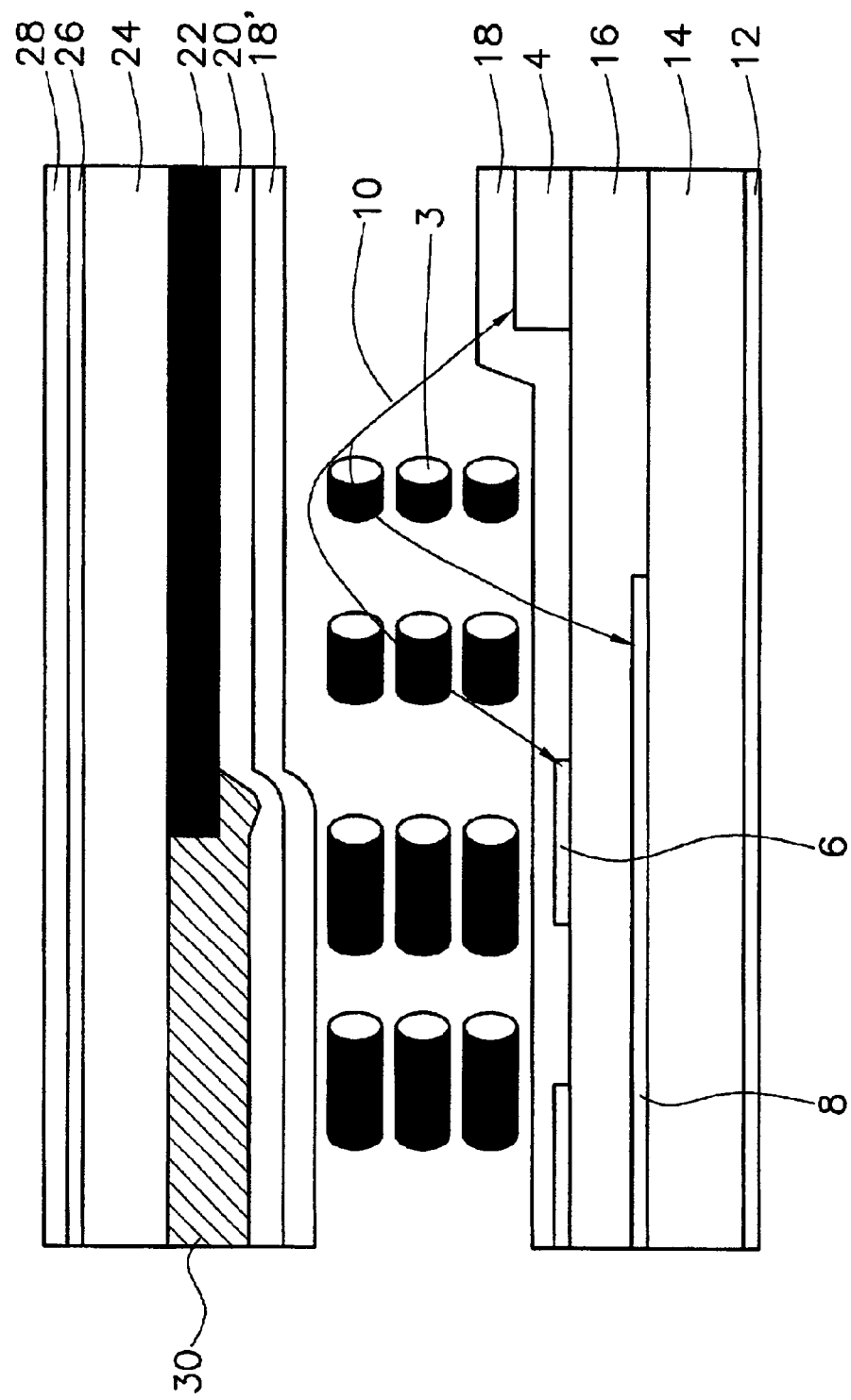
FIG. 2 is a cross section view of conventional liquid crystal display.

As a result, the polarizer axis of the lower polarizing plate 12 and the major axis of the liquid crystal molecule 3 are not separated and therefore, it is not required to have a large black matrix (22 in FIG. 2). And, it is possible that the BM 22' of the upper substrate is formed to have a width of approximately 4 μm on the data bus line 4 or on the gate bus line 2 in the region wherein the rubbing direction of positive liquid crystal corresponds with that of the noise field 10, in consideration of Assembly margin. And, it is also possible to skip the BM 22' when there is no problem of color shift. It is also applied to IPS mode wherein the counter electrode 8' and the pixel electrode 6' are made of opaque metal and the electrodes 8', 6' are respectively patterned to have a shape of clamp in one sub-pixel or to alternatively have a slant line (/) shape and an inverse-slant line (\) shape by sub-pixels.

As shown in FIG. 3A, the pixel electrode 6' made of a second ITO is patterned so that the patterned angle of slit forms an angle of less than ±45°, and more desirably, ±12° with the gate bus line 2.

This is when positive liquid crystals are employed and the rubbing direction is parallel to the gate bus line 2. According to the structure, although the voltage between the pixel electrode 6' and the counter electrode 8' is applied by 0V, that is, at off state, the noise field 10 is applied between the data bus line 4 and the pixel electrode 6' or between the data bus line 4 and the counter electrode 8'.

Figure 6:
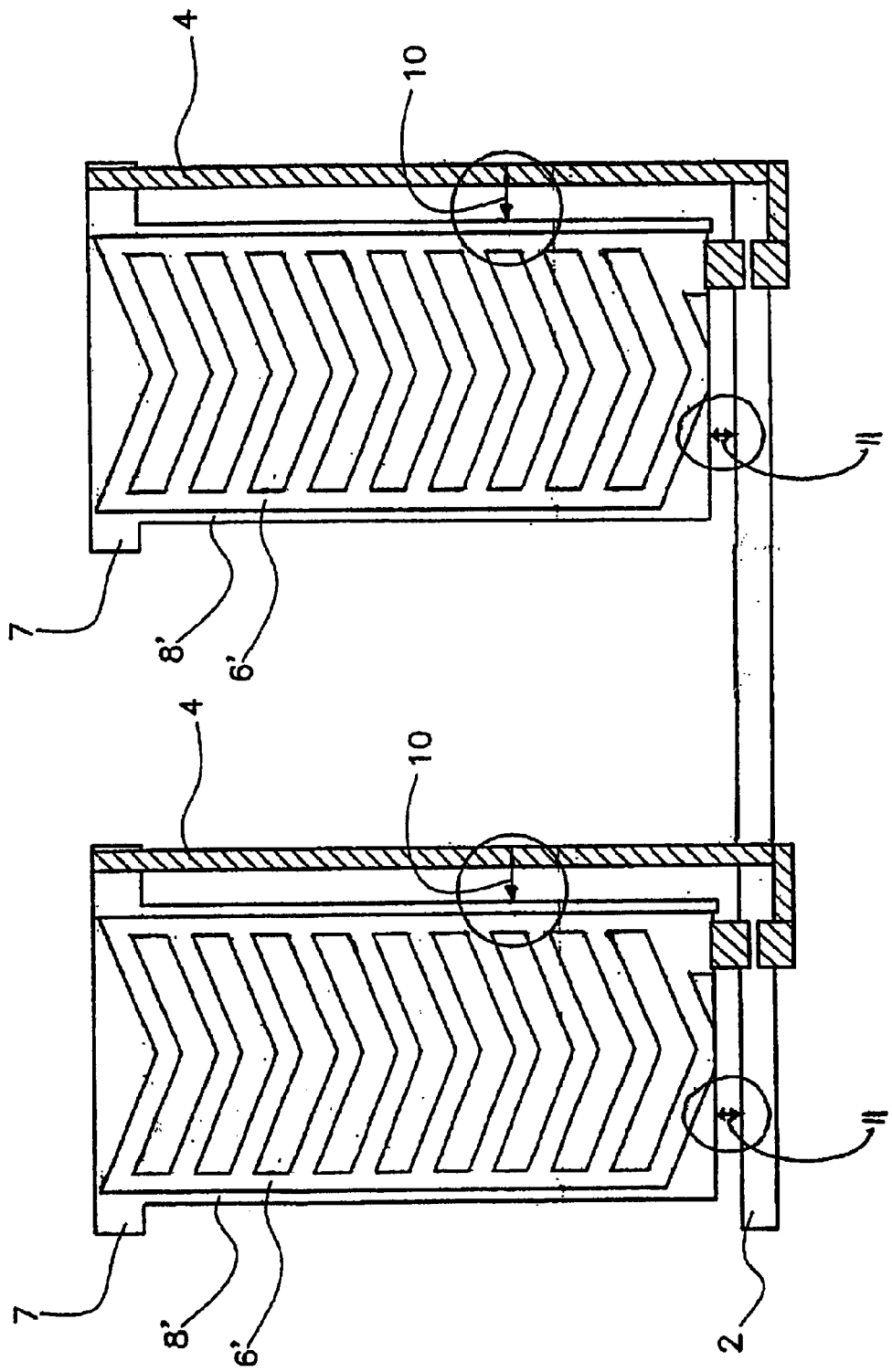
FIG. 6 is a drawing for showing two unit pixels arranged side by side among a plurality of unit pixels in a liquid display device according to an embodiment of the present invention.

It is generally well known in the art of liquid display device that a liquid display device is comprised of a plurality of unit pixels, and the device depicted in FIG. 3A of the present application, for example, may represent generally the structure of each unit pixel. For an illustration, FIG. 6 (not drawn to scale) shows an example of two unit pixels (among a plurality of unit pixels in a liquid display device) arranged side-by-side. A plurality of these unit pixels shown as an illustration in FIG. 6 may be connected to each other in a two-dimensional array of unit pixels in the liquid crystal display.

FIG. 3B shows the data bus line 4 applied by the noise field 10, wherein the rubbing direction of positive liquid crystal corresponds with that of the noise field 10.

Referring to FIG. 3C, although the noise field 10 is applied, the major axis of the liquid crystal molecule 3 is not separated form the polarizer axis of the lower polarizing plate 12. Therefore, leakage light is not generated in normally black mode.

Therefore, as shown in FIG. 4, the black matrix 22' of the upper substrate has a width the same as or smaller than the distance between the counter electrodes 8' formed with the data bus line 4 interposed, that is, less than 21 μm, and more desirably, approximately 4 μm. In this case, the aperture ratio is not reduced by misalignment generated in assembly of upper and lower substrates.

Figure 5:
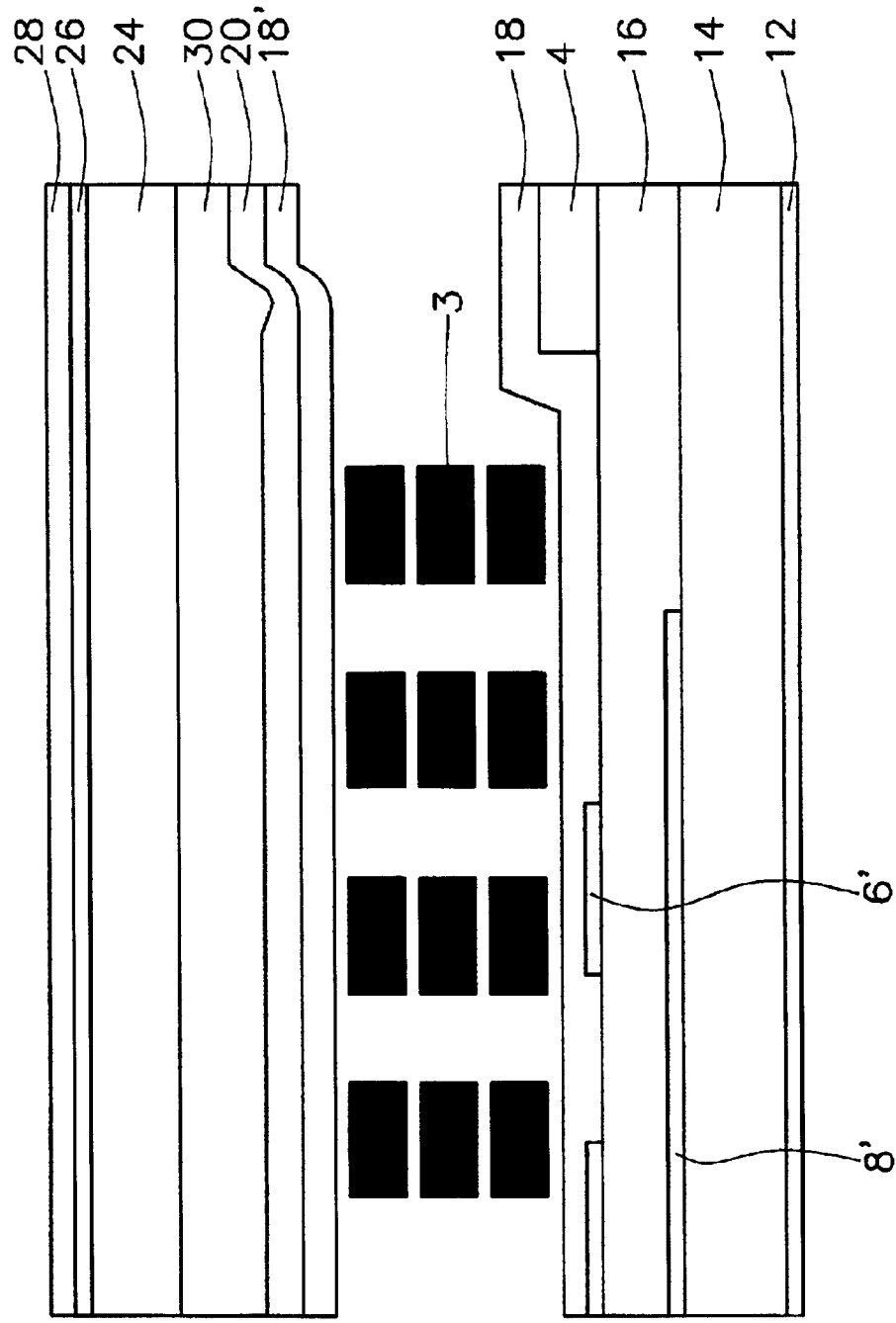
FIG. 5 is a lateral cross sectional view of liquid crystal display according to another embodiment of the present invention.

FIG. 5 is a lateral cross sectional view for showing a liquid crystal display device according to another embodiment of the present invention.

Referring to FIG. 5, it is also possible to completely remove the black matrix of upper substrate 22 in FIG. 2 or 22' in FIG. 4 from the upper part of the data bus line 4, if there is no problem of color shift. According to this structure, R, G, and B region 30 is overlapped, thereby relatively reducing transmittance to be employed as black matrix. And, the aperture ratio is not reduced by misalignment in assembly of upper and lower substrates.

According to another embodiment of the present invention, it is also possible to reduce the width of or completely remove the black matrix on the gate bus line 2. In this case, the array structure is the same as the above-mentioned structure and similarly, the pixel electrode 6', made of a second ITO, is patterned to have a shape of clamp in one sub-pixel and to alternatively have a slant line (/) shape and an inverse-slant line (\) shape by sub-pixels in one pixel.

The rubbing direction of the lower substrate 14 is perpendicular to the gate bus line 2 and the rubbing direction of the upper substrate is anti-parallel or parallel to that of the lower substrate 14.

The polarizer axis of the lower polarizing plate 12, attached on the outer side of the lower substrate 14, corresponds with the rubbing direction of the lower substrate 14 and an analyzer axis of the upper polarizing plate 28, attached on the outer side of the upper substrate 24, is perpendicular to the rubbing direction of the lower substrate 14, thereby forming normally black mode wherein dark state is maintained in applying no voltage. The noise field 10 is applied between the gate bus line 2 and the pixel electrode 6' or the counter electrode 8'.

However, the rubbing direction corresponds with the noise field 10 direction. And, when positive liquid crystals are employed, the major axis of the liquid crystal molecule 3 is arranged to the rubbing direction and the polarity of spontaneous polarization of the liquid crystal molecule 3, generated by the electric field, is formed at the terminal of major axis of the liquid crystal molecule 3. Therefore, when the rubbing direction corresponds with that of the noise field 10, the liquid crystal molecules 3 are not affected by the noise field 10.

As a result, the polarizer axis of the lower polarizing plate 12 is not separated from the major axis of the liquid crystal molecule 3 and therefore, it is not required to have a large black matrix as shown in conventional method.

Therefore, it is possible that the black matrix on the gate bus line 2 is formed to have a width the same as or smaller than that of the gate bus line 2, that is, less than 30 μm, and more desirably, approximately 4 μm. And, it is also possible to skip the black matrix on a predetermined part if there is no problem of color shift in white.

According to this structure, R, G, and B region 30 is overlapped, thereby relatively reducing transmittance to be employed as black matrix. However, the gate bus line 2 has a region wherein the rubbing direction is not the same as that of the noise field 10. Therefore, it is required to provide the black matrix on this part.

Similarly, it is also applied to IPS mode wherein the counter electrode 8' and the pixel electrode 6' are made of opaque metal and the electrodes 8', 6' are respectively patterned to have a shape of clamp in one sub-pixel or to alternatively have a slant line (/) shape and an inverse-slant line (\) shape by sub-pixels.

As described above, according to the present invention, the pixel electrode and the counter electrode are arranged on the lower substrate, thereby improving the aperture ratio in IPS mode or FFS mode and increasing panel brightness. Therefore, the present invention can be advantageously employed in products necessary for high brightness, such as liquid crystal TV.

In the drawings and specification, there have been disclosed typical preferred embodiments of the invention. Although specific terms are employed, they are used in a generic and descriptive sense only and not for purposes of limitation, the scope of the invention being set forth in the following claims.

What is claimed is:

1. A liquid crystal display device comprising:
   a lower substrate having a lower inner surface and a lower outer surface, wherein the lower substrate is rubbed in a rubbing direction for alignment of liquid crystal molecules;
   a lower polarizing plate formed on the lower outer surface;
   an upper substrate having an upper inner surface and an upper outer surface, wherein the lower inner surface and the upper inner surface face each other at a distance in a substantially parallel manner;
   an upper polarizing plate formed on the upper outer surface;
   a counter electrode formed on a portion of the lower inner surface, wherein the counter electrode has a rectangular plate shape;
   an insulating layer formed on the counter electrode and the lower inner surface;
   a pixel electrode formed on a portion of the insulating layer
   a data bus line formed on a portion of the insulating layer, wherein a noise field is formed between the data bus line and the pixel electrode and between the data bus line and the counter electrode and further wherein the rubbing direction of the lower substrate substantially corresponds to the direction of the noise field;
   a gate bus line formed substantially perpendicular to the data bus line; and
   a black matrix formed on the upper inner surface substantially covering the data bus line,
      wherein the rubbing direction of the lower substrate is substantially parallel to the gate bus line, which is also substantially parallel to the direction of the noise field formed between the data bus line and the counter electrode or between the data bus line end the pixel electrode, and further wherein the black matrix formed on the upper inner surface has a width of less than 6 µm that is substantially equal to or smaller than the distance between the counter electrode in one pixel and another counter electrode in an adjacent pixel with the data bus line formed between the two counter electrodes of the two adjacent pixels.

2. A liquid crystal display device comprising:
a lower substrate having a lower inner surface and a lower outer surface, wherein the lower substrate is rubbed for alignment of liquid crystal molecules;
a lower polarizing plate formed on the lower outer surface;
an upper substrate having an upper inner surface and an upper outer surface, wherein the lower inner surface and the upper inner surface face each other at a distance in a substantially parallel manner;
an upper polarizing plate formed on the upper outer surface;
a counter electrode formed on a portion of the lower inner surface;
an insulating layer formed on the counter electrode and the lower inner surface;
a pixel electrode formed on a portion of the insulating layer, wherein the pixel electrode is made from a plurality of V-shaped conductors symmetrically arranged with one end of each of the V-shaped conductors connected to each other by one continuous conductor and with the other end of each of the V-shaped conductors connected to each other by another continuous conductor, thereby forming a V-shaped slit between two symmetrically arranged V-shaped conductors;
a data bus line formed on a portion of the insulating layer; and
a gate bus line formed substantially perpendicular to the data bus line, wherein a noise field is formed between the gate bus line and the pixel electrode and between the gate bus line end the counter electrode, and further wherein the rubbing direction of the lower substrate substantially corresponds to the direction of the noise field,
wherein the rubbing direction of the lower substrate is perpendicular to the gate bus line, end the noise field is formed between the gate bus line and the counter electrode or between the gate bus line and the pixel electrode and therefore, black matrix of the upper substrate is formed on the gate bus line to have a width the same as or smaller than that of the gate bus line.

3. The liquid crystal display device according to claim 2, wherein the counter electrode and the pixel electrode are made of a transparent electrical conductor including an indium tin oxide (ITO) for forming the fringe field switching (FFS) mode.

4. The liquid crystal display device according to claim 2, further comprising a black matrix formed on the upper inner surface substantially covering the data bus line, wherein the rubbing direction of the lower substrate is substantially parallel to the gate bus line, which is also substantially parallel to the direction of the noise field formed between the data bus line and the counter electrode or between the data bus line and the pixel electrode.

5. The liquid crystal display device according to claim 2, wherein the upper substrate has a rubbing direction anti-parallel or parallel to that of the lower substrate.

6. The liquid crystal display device according to claim 2, wherein the lower polarizing plate has a polarizer axis corresponding with the rubbing direction of the lower substrate.

7. The liquid crystal display device according to claim 2, wherein the upper polarizing plate has an analyzer axis perpendicular to the rubbing direction of the lower substrate.

8. A liquid crystal display device comprising:
a lower substrate having a lower inner surface and a lower outer surface, wherein the lower substrate is rubbed for alignment of liquid crystal molecules;
a lower polarizing plate formed on the lower outer surface;
an upper substrate having an upper inner surface and an upper outer surface, wherein the lower inner surface and the upper inner surface face each other at a distance in a substantially parallel manner;
an upper polarizing plate formed on the upper outer surface
a counter electrode formed on a portion of the lower inner surface;
an insulating layer formed on the counter electrode and the lower inner surface;
a pixel electrode formed on a portion of the insulating layer, wherein the pixel electrode is made from a plurality of V-shaped conductors symmetrically arranged with one end of each of the V-shaped conductors connected to each other by one continuous conductor and with the other end of each of the V-shaped conductors connected to each other by another continuous conductor, thereby forming a V-shaped slit between two symmetrically arranged V-shaped conductors;
a data bus line formed on a portion of the insulating layer; and
a gate bus line formed substantially perpendicular to the data bus line, wherein a noise field is formed between the gate bus line and the pixel electrode and between the gate bus line and the counter electrode, and further wherein the rubbing direction of the lower substrate substantially corresponds to the direction of the noise field,
wherein the rubbing direction of the lower substrate is perpendicular to the gate bus line and there is no black matrix of the upper substrate.

9. The liquid crystal display device according to claim 8, wherein the counter electrode and the pixel electrode are made of a transparent electrical conductor including an indium tin oxide (ITO) for forming the fringe field switching (FFS) mode.

10. The liquid crystal display device according to claim 8, further comprising a black matrix formed on the upper inner surface substantially covering the data bus line, wherein the rubbing direction of the lower substrate is substantially parallel to the gate bus line, which is also substantially parallel to the direction of the noise field formed between the data bus line and the counter electrode or between the data bus line and the pixel electrode.

11. The liquid crystal display device according to claim 8, wherein the upper substrate has a rubbing direction anti-parallel or parallel to that of the lower substrate.

12. The liquid crystal display device according to claim 8, wherein the lower polarizing plate has a polarizer axis corresponding with the rubbing direction of the lower substrate.

13. The liquid crystal display device according to claim 8, wherein the upper polarizing plate has an analyzer axis perpendicular to the rubbing direction of the lower substrate.

14. A liquid crystal device comprising:

a lower substrate having a lower inner surface and a lower outer surface, wherein the lower substrate is rubbed for alignment of liquid crystal molecules;

a lower polarizing plate formed on the lower outer surface;

an upper substrate having an upper inner surface and an upper outer surface, wherein the lower inner surface and the upper inner surface face each other at a distance in a substantially parallel manner;

an upper polarizing plate formed on the upper outer surface;

a counter electrode formed on a portion of the lower inner surface;

an insulating layer formed on the counter electrode and the lower inner surface;

a pixel electrode formed on a portion of the insulating layer, wherein the pixel electrode is a data bus line formed on a portion of the insulating layer;

a gate bus line formed substantially perpendicular to the data bus line, wherein a noise field is formed between the gate bus line and the pixel electrode and between the gate bus line and the counter electrode, and further wherein the rubbing direction of the lower substrate substantially corresponds to the direction of the noise field; and a black matrix formed on the upper inner surface substantially covering the gate bus line, wherein the rubbing direction of the lower substrate is substantially parallel to the data bus line, which is also substantially parallel to the direction of the noise field formed between the gate bus line and the counter electrode or between the gate bus line and the pixel electrode, and further wherein the black matrix formed on the upper inner surface has a width of less than 6 $\mu$m that is substantially equal to or smaller than the distance between the counter electrode in one pixel and another counter electrode in an adjacent pixel with the data bus line formed between the two counter electrodes of the two adjacent pixels.

* * * * *